(12) United States Patent
Huang et al.

(10) Patent No.: US 12,468,009 B2
(45) Date of Patent: Nov. 11, 2025

(54) INDOOR POSITIONING SYSTEM AND INDOOR POSITIONING METHOD

(71) Applicant: Nanning FuLian FuGui Precision Industrial Co., Ltd., Nanning (CN)

(72) Inventors: Mei-Yan Huang, Nanning (CN); Neng-Qian Yang, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 441 days.

(21) Appl. No.: 18/141,192

(22) Filed: Apr. 28, 2023

(65) Prior Publication Data
US 2024/0280662 A1 Aug. 22, 2024

(30) Foreign Application Priority Data
Feb. 22, 2023 (CN) .......................... 202310153032.4

(51) Int. Cl.
| | | |
|---|---|---|
| G01S 5/06 | (2006.01) | |
| G01S 5/00 | (2006.01) | |
| H04W 76/10 | (2018.01) | |

(52) U.S. Cl.
CPC .............. G01S 5/06 (2013.01); G01S 5/0081 (2013.01); H04W 76/10 (2018.02); G01S 2205/02 (2020.05)

(58) Field of Classification Search
CPC .......... G06Q 30/0261; G06Q 30/0267; G06Q 30/0639; H04W 4/023; H04W 4/02; H04W 4/029; H04W 4/80; H04W 64/006; H04W 76/10; H04W 76/14; H04W 92/18; H04W 4/021; H04W 84/12; G01S 13/765; G01S 2205/02; G01S 5/0081; G01S 5/06; G01S 7/006; G01S 5/0289; G01S 13/75; G01S 13/878; G01S 5/0063; G01S 2205/01
See application file for complete search history.

(56) References Cited

U.S. PATENT DOCUMENTS

| | | | | |
|---|---|---|---|---|
| 2013/0090131 | A1* | 4/2013 | Jalkanen | H04W 4/80 455/456.1 |
| 2020/0386848 | A1* | 12/2020 | Wirola | G01S 5/02523 |
| 2020/0389764 | A1* | 12/2020 | Jeong | H04W 4/029 |

FOREIGN PATENT DOCUMENTS

| | | |
|---|---|---|
| CN | 110691981 A | 1/2020 |
| CN | 111200785 | 5/2020 |
| CN | 113567910 A | 10/2021 |
| CN | 114509747 A | 5/2022 |
| MY | 208451 A * | 5/2025 |
| WO | 2019136918 A1 | 7/2019 |

* cited by examiner

Primary Examiner — Olumide Ajibade Akonai
(74) Attorney, Agent, or Firm — ScienBiziP, P.C.

(57) ABSTRACT

An indoor positioning system includes: a wireless network device, configured to receive a positioning request initiated by positioning tag, and send a handshake communication request; a positioning headend, configured to communicate with the wireless network device and the positioning tag according to the handshake communication request, and collect radio wave signals sent by the positioning tag, and calculate the phase information of the positioning tag according to the radio wave signal; a positioning unit, configured to calculate position coordinate information of the positioning tag according to the phase information, thereby improving the positioning accuracy and reducing the cost.

10 Claims, 6 Drawing Sheets

INDOOR POSITIONING SYSTEM AND INDOOR POSITIONING METHOD

FIELD

The present disclosure relates to a field of communication technology, in particular to an indoor positioning system and an indoor positioning method.

BACKGROUND

At present, the planning and layout of indoor positioning requires the construction of a positioning system and a communication system separately, resulting in high initial cost, low positioning accuracy, and the use efficiency cannot be quickly displayed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
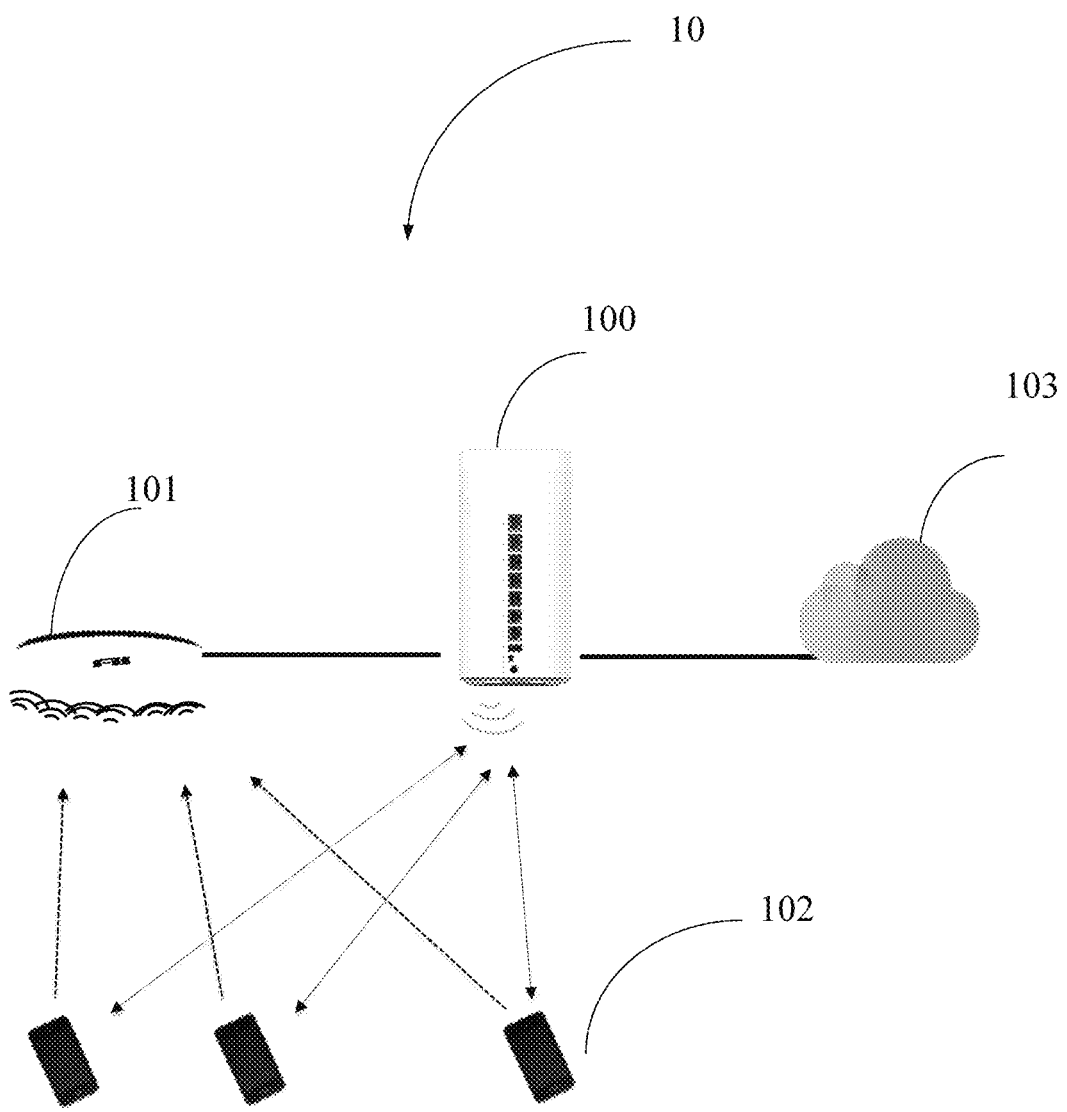
FIG. 1 is a system frame diagram of an embodiment of the indoor positioning system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a system frame diagram of an embodiment of an indoor positioning system 10 according to the present disclosure. In the embodiment, the indoor positioning system 10 includes a wireless network device 100, a positioning headend 101, positioning tags 102 and a control platform 103. When the positioning tags 102s initiates a positioning request, the wireless network device 100 assists the positioning headend 101 to establish a communication connection with the positioning tags 102 according to the positioning request. After the positioning headend 101 establishes a communication connection with the positioning tags 102, the positioning headend 101 receives the radio wave signals sent by the positioning tags 102, and calculates phase information of the positioning tags 102 according to the radio wave signals. The positioning unit (not shown in the figure) calculates position coordinate information of the positioning tags 102 according to the phase information. The wireless network device 100 sends the position coordinate information to the control platform 103, and can also feed the position coordinate information back to the positioning tags 102.

Figure 2:
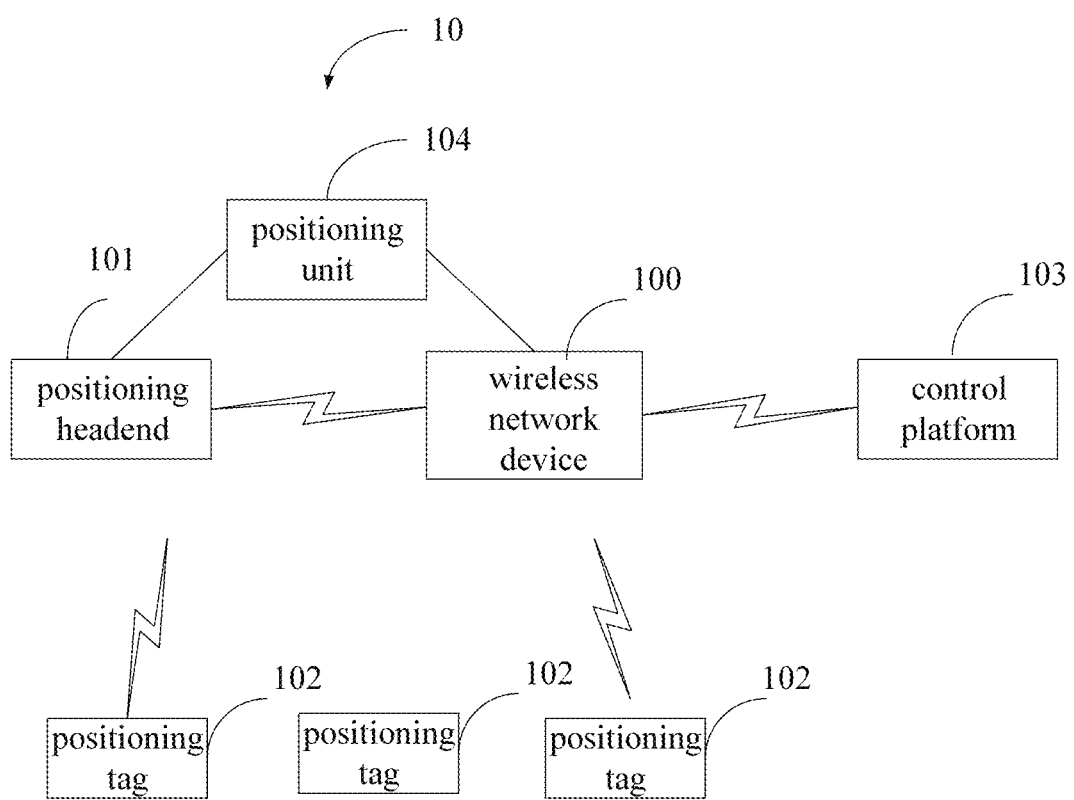
FIG. 2 is a block schematic diagram of an embodiment of the indoor positioning system of the present disclosure.

Referring to FIG. 2, FIG. 2 is a block schematic diagram of an embodiment of the indoor positioning system 10 of the present disclosure. In the embodiment, the indoor positioning system 10 includes a wireless network device 100, a positioning headend 101, positioning tags 102, a control platform 103 and a positioning unit 104. The wireless network device 100 is configured to receive a positioning request initiated by the positioning tags 102 and send a handshake communication request. Specifically, the wireless network device 100 and the positioning tags 102 can communicate via the IEEE 802.11ax standard. In the embodiment, the wireless network device 100 is preferably a WiFi6 mesh device. The positioning headend 101 is electrically connected to the wireless network device 100 and is configured to establish a communication connection with the wireless network device 100 and the positioning tags 102 according to the handshake communication request. When the positioning headend 101 establishes the communication connection with the positioning tags 102, the positioning headend 101 collects the radio wave signals sent by the positioning tags 102, and calculates the phase information of the positioning tags 102 according to the radio wave signals. The number of the position tags depends on actual needs. The positioning unit 104 is configured to calculate the position coordinate information of the positioning tags 102 according to the phase information. The wireless network device 100 is also configured to send the position coordinate information of the positioning tags 102 to the control platform 103. The control platform 103 can be a monitoring platform, through which managers can check the position coordinate information of the position tags 102 in real time. The position tags 102 can be set on the work card of the working user. Therefore, the managers can locate the working users through the control platform 103 to help the managers master the real-time situation of the working users. The control platform 103 can send an alarm message when the positioning tags 102 is out of bounds, close to the dangerous sources and other abnormal situations.

In the embodiment, the positioning tags 102 can be mobile terminals, and the wireless network device 100 can also feedback the position coordinate information to the mobile terminals, so that the holder of the mobile terminal can know its own position in real time. For abnormal situations such as out of bounds and close to dangerous sources, the mobile terminal can send out alarm information.

Figure 3:
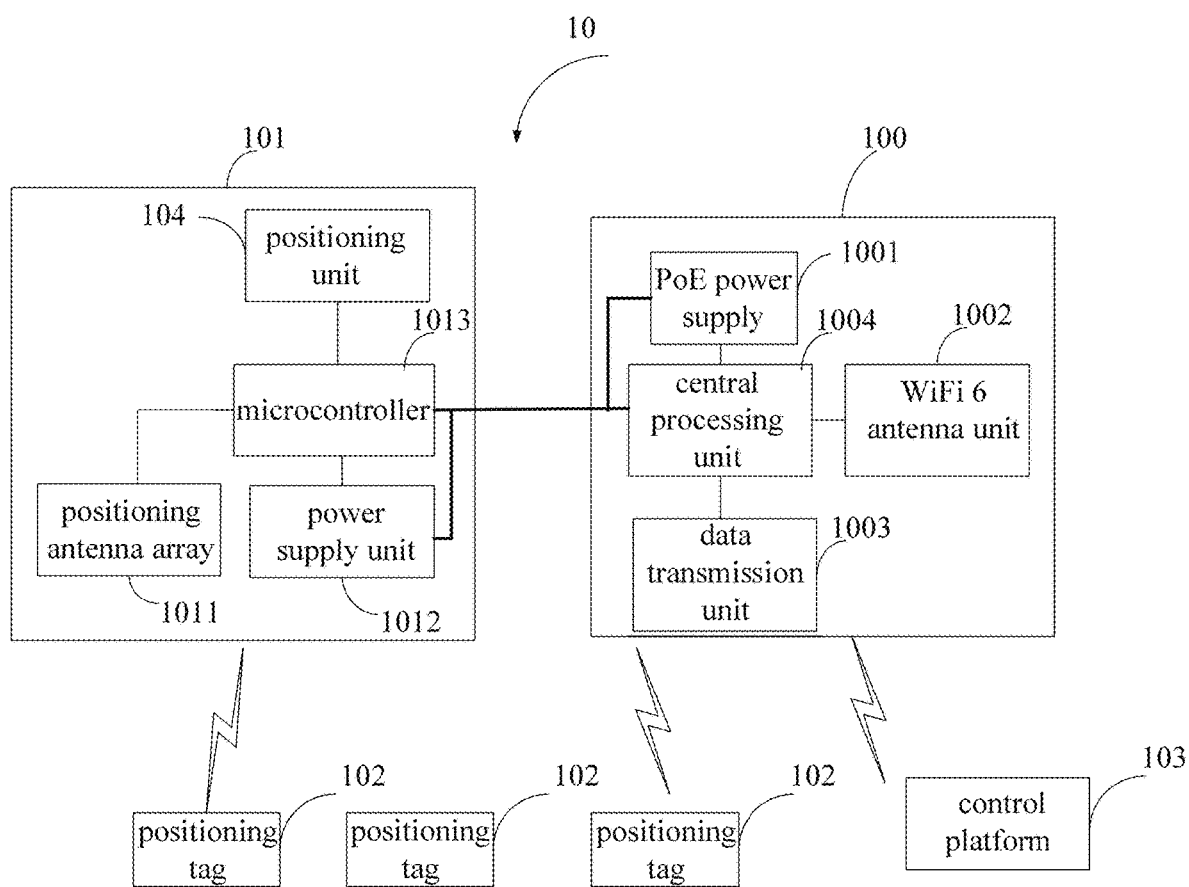
FIG. 3 is a block schematic diagram of another embodiment of the indoor positioning system of the present disclosure.

Referring to FIG. 3, FIG. 3 is a block diagram of another embodiment of the indoor positioning system 10 of the present disclosure. In the embodiment, the wireless network device 100 includes a PoE power supply 1001, a first antenna array 1002, a data transmission unit 1003, and a central processing unit 1004. The positioning headend 101 includes a second antenna array 1011, a power supply unit 1012 and a microcontroller 1013.

In the embodiment, the PoE power supply 1001 is electrically connected to the power supply unit 1012 of the positioning headend 101 for supplying power to the positioning headend 101. The wireless network device 100 supplies the positioning headend 101 via Power over Ethernet, which can greatly reduce the additional cost of the traditional positioning system that needs to build an additional power network or power solution. The first antenna array 1002 is configured to receive the positioning request initiated by the positioning tags 102. The central processing unit 1004 is electrically connected to the first antenna array 1002, and is configured to send a handshake communication request according to the positioning request. The data transmission unit 1003 is electrically connected to the central processing unit 1004 and configured to establish the communication connection with the positioning headend 101 and the positioning tags 102 according to the handshake communication request. The second antenna array 1011 is configured to communicate with the positioning tags 102, and collects radio wave signals initiated by the positioning tags 102 after the second antenna array 1011 establishes the communication connection with the positioning tags 102. The microcontroller 1013 is electrically connected to the central processing unit 1004 through a serial port or an Ethernet port. In the embodiment, the microcontroller 1013 is preferably electrically connected to the central processing unit 1004 through an Ethernet port. The microcontroller 1013 receives the handshake communication request, and controls the second antenna array 1011 to establish the communication connection with the positioning tags 102. The microcontroller 1013 also calculates the phase information of the positioning tags 102 according to the radio wave signals. The power supply unit 1012 is electrically connected to the PoE power supply 1001 for supplying power to the microcontroller 1013.

In the embodiment, the positioning unit 104 is arranged in the positioning headend 101, and the positioning unit 104 is electrically connected to the microcontroller 1013 to receive the phase information sent by the microcontroller 1013, and calculate the position coordinate information of the positioning tags 102 according to the phase information. In a specific embodiment of the present disclosure, the positioning unit 104 can be integrated in the microcontroller 1013. The microcontroller 1013 is also configured to send the position coordinate information of the positioning tags 102 to the central processing unit 1004 of the wireless network device 100, so that the data transmission unit 100 of the wireless network device 100 sends the position coordinate information of the positioning tags 102 to the control platform 103.

Figure 4:
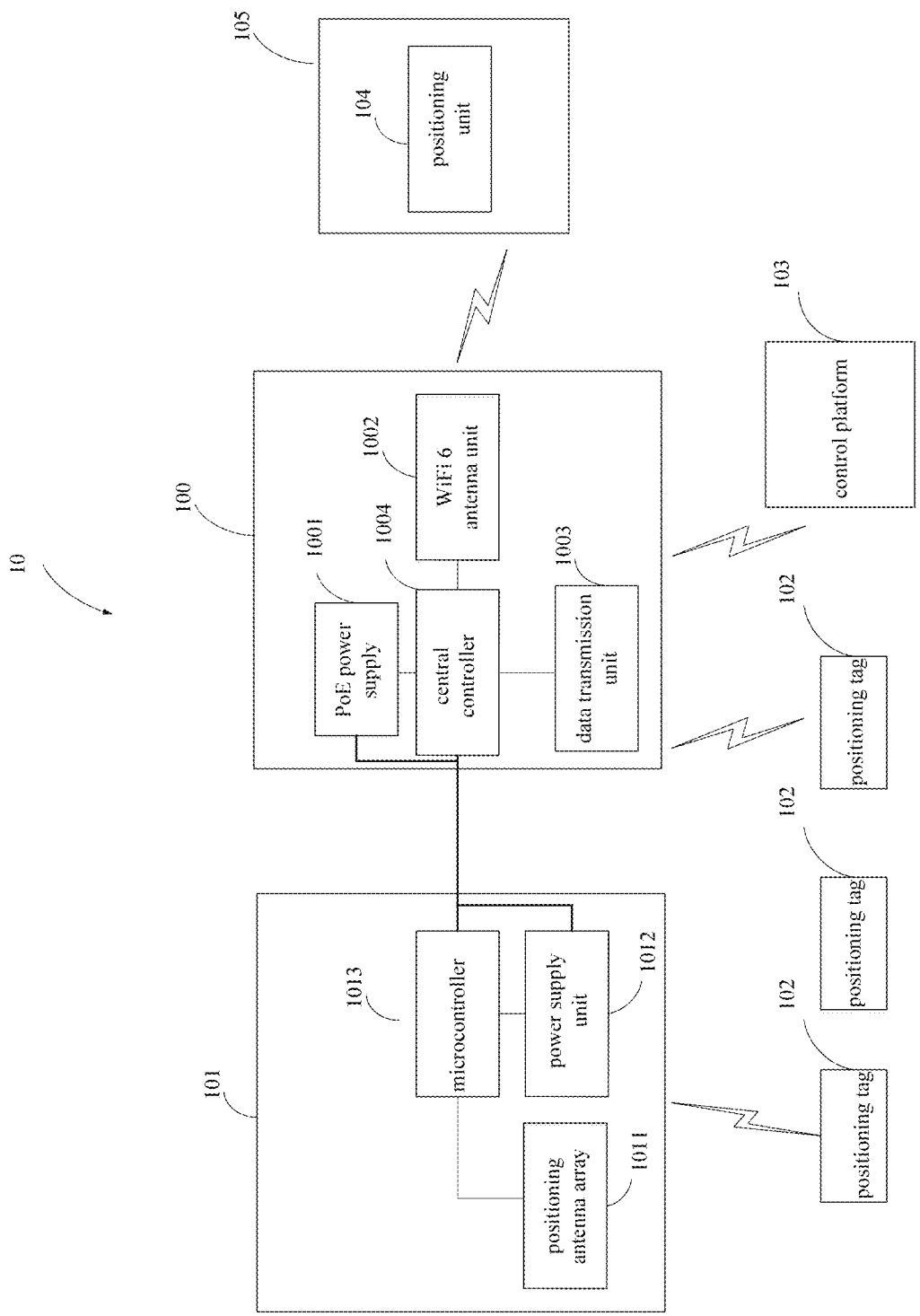
FIG. 4 is a block schematic diagram of another embodiment of the indoor positioning system of the present disclosure.

Referring to FIG. 4, FIG. 4 is a block schematic diagram of another embodiment of the indoor positioning system 10 of the present disclosure. In the embodiment, the wireless network device 100 includes a PoE power supply 1001, a first antenna array 1002, a central processing unit 1004 and a data transmission unit 1003. The positioning headend 101 includes a second antenna array 1011, a microcontroller 1013 and a power supply unit 1012.

In the embodiment, the first antenna array 1002 receives the positioning request initiated by the positioning tags 102. The central processing unit 1004 sends a handshake communication request according to the positioning requirements. The data transmission unit 1003 establishes a communication connection with the positioning headend 101 and the positioning tags 102 according to the handshake communication request. When the second antenna array 1011 of the positioning headend 101 establishes the communication connection with the positioning tags 102, the second antenna array 1011 collect radio wave signals initiated by the positioning tags 102. The microcontroller 1013 of the positioning headend 101 receives the handshake communication request and controls the second antenna array 1011 to establish the communication connection with the positioning tags 102. The microcontroller 1013 also calculates the phase information of the positioning tags 102 based on the radio wave signals.

In the embodiment, the indoor positioning system 10 further includes an edge server 105, and the positioning unit 104 is arranged in the edge server 105. The edge server 105 provides users with a channel to enter the network and communicate with other server devices. The edge server 105 may be a firewall server, a cache server, a load balancing server, a DNS server, and the like. The data transmission unit 1003 sends the phase information of the positioning tags 102 to the edge server 105. The positioning unit 104 calculates the positioning coordinate information in the edge server 105 according to the phase information. The edge server 105 also transmits the position coordinate information back to the wireless network device 100, and then data transmission unit 1003 shares the position coordinate information of the positioning tags 102 to the control platform 103.

Figure 5:
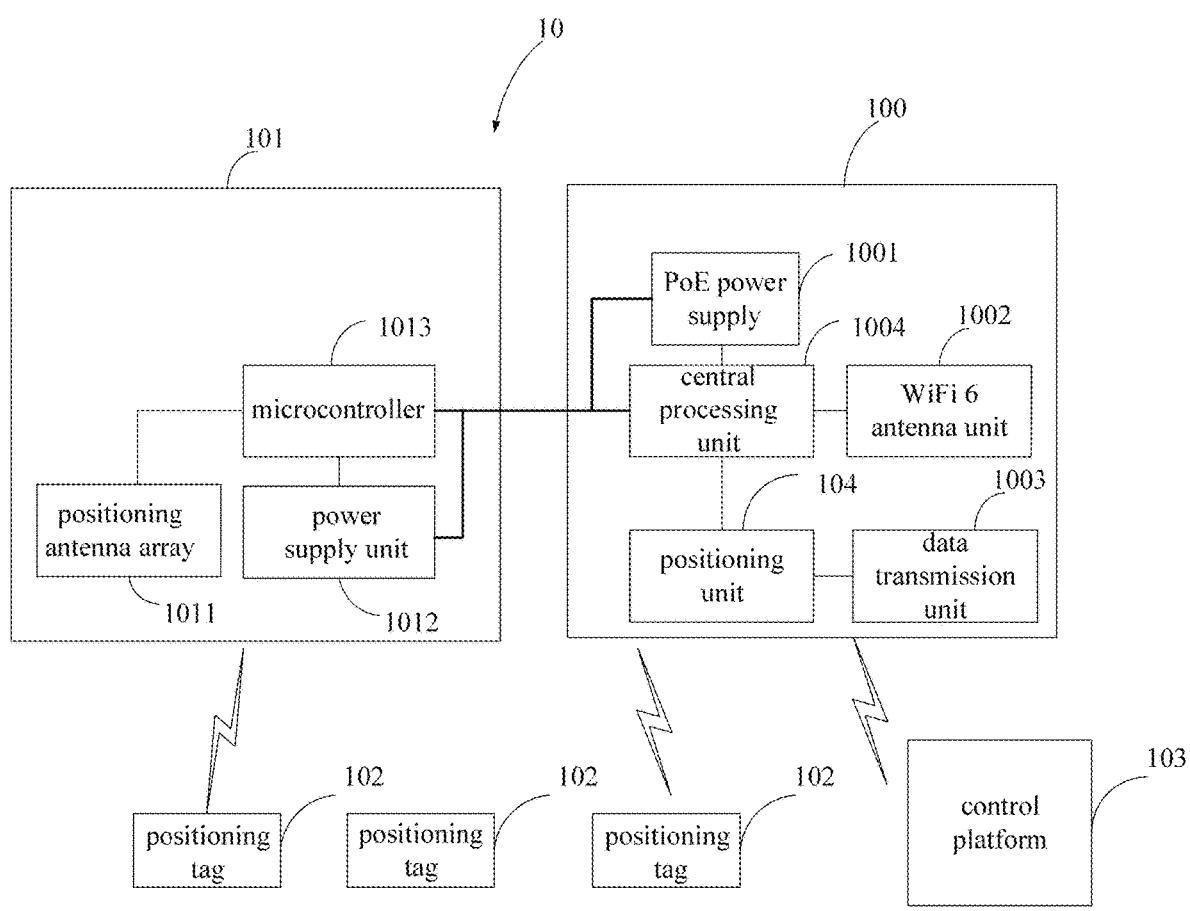
FIG. 5 is a block schematic diagram of another embodiment of the indoor positioning system of the present disclosure.

Referring to FIG. 5, FIG. 5 is a block schematic diagram of another embodiment of the indoor positioning system 10 of the present disclosure. In the embodiment, the wireless network device 100 includes a PoE power supply 1001, a first antenna array 1002, a central processing unit 1004 and a data transmission unit 1003. The positioning headend 101 includes a second antenna array 1011, a microcontroller 1013 and a power supply unit 1012.

In the embodiment, the first antenna array 1002 receives the positioning request initiated by the positioning tags 102. The central processing unit 1004 sends a handshake communication request according to the positioning requirements. The data transmission unit 1003 establishes a communication connection with the positioning headend 101 and the positioning tags 102 according to the handshake communication request. When the second antenna array 1011 of the positioning headend 101 establishes the communication connection with the positioning tags 102, the second antenna array 1011 collect radio wave signals initiated by the positioning tags 102. The microcontroller 1013 of the positioning headend 101 receives the handshake communication request and controls the second antenna array 1011 to establish the communication connection with the positioning tags 102. The microcontroller 1013 also calculates the phase information of the positioning tags 102 according to the radio wave signals.

In the embodiment, the positioning unit 104 is arranged in the wireless network device 100, and in a specific embodiment, the positioning unit 104 may be integrated in the central processing unit 1004. After the microcontroller 1013 sends the phase information of the positioning tags 102 to the central processing unit 1004 of the wireless network device 100, the positioning unit 104 calculates the coordinate position information according to the phase information.

Figure 6:
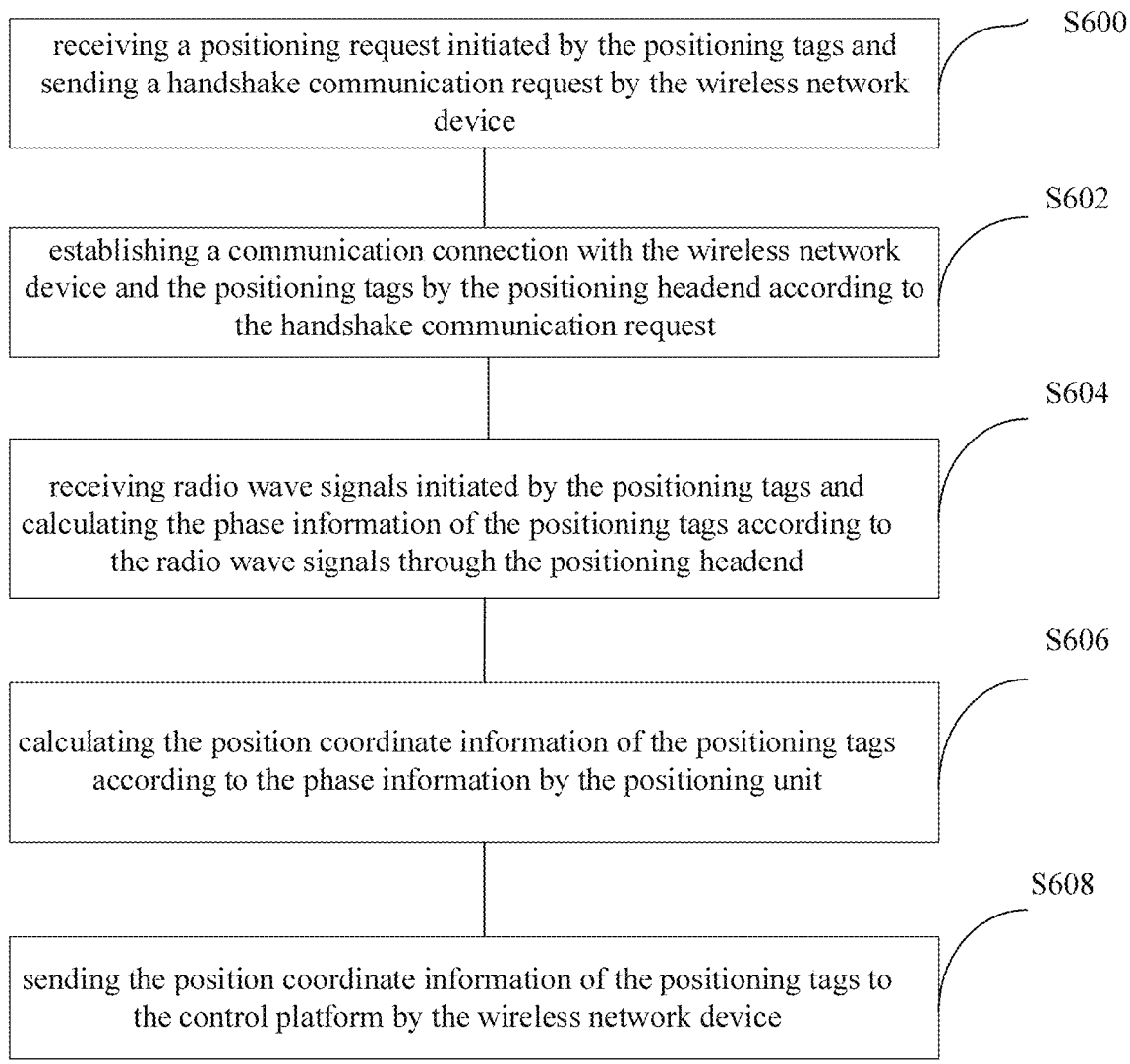
FIG. 6 is a schematic flowchart of an embodiment of an indoor positioning method of the present disclosure.

Referring to FIG. 6, FIG. 6 is a schematic flowchart of an embodiment of an indoor positioning method according to the present disclosure. In the embodiment, the indoor positioning method is applied to the indoor positioning system 10, and the indoor positioning system 10 includes a wireless network device 100, a positioning headend 101, positioning tags 102, a control platform 103, and a positioning unit 104. The indoor positioning method includes:

Step S600: receiving a positioning request initiated by the positioning tags 102 and sending a handshake communication request by the wireless network device 100.
  Step S602: establishing a communication connection with the wireless network device 100 and the positioning tags 102 by the positioning headend according to the handshake communication request.
  Step S604: receiving radio wave signals initiated by the positioning tags 102 and calculating the phase information of the positioning tags 102 according to the radio wave signals through the positioning headend 101.
  Step S606: calculating the position coordinate information of the positioning tags 102 according to the phase information by the positioning unit 104.
  Step S608: sending the position coordinate information of the positioning tags 102 to the control platform 103 by the wireless network device 100.

Specifically, in an embodiment of the present disclosure, the positioning unit 104 is arranged in the positioning headend 101. The step S606 specifically includes: calculating the position coordinate information of the positioning tags 102 according to the phase information in the positioning headend 101 by the positioning unit 104.

In an embodiment of the present disclosure, the indoor positioning system 10 further includes an edge server 105, and the positioning unit 104 is arranged in the edge server 105. The step of the calculating the position coordinate information of the positioning tags 102 according to the phase information by the positioning unit 104, includes: receiving the phase information sent by the wireless network device 100 through the edge server 105; calculating the position coordinate information of the positioning tags 102 according to the phase information by the positioning unit 104 in the edge server 105; and returning the position coordinate information to the wireless network device 100 by the edge server 105 after the location coordinate information is calculated.

In an embodiment of the present disclosure, the positioning unit 104 is arranged in the wireless network device 100, and the step of the calculating the position coordinate information of the positioning tags 102 according to the phase information by the positioning unit 104, includes: sending the phase information to the wireless network device 100 by the positioning headend 101; and calculating the position coordinate information of the positioning tags 102 according to the phase information in the wireless network device 100 by the positioning unit 104.

Compared with the prior art, in the indoor positioning system provided by the embodiment of the present disclosure, the wireless network device receives the positioning request initiated by the positioning tags, and sends out a handshake communication request to assist the positioning headend to establish a communication connection with the positioning tag; thus, the positioning headend collects the radio wave signals sent by the positioning tags, and calculates the phase information of the positioning tag according to the radio wave signals, and then the positioning unit calculates the positioning coordinate information according to the phase information; finally, the position coordinate information is shared to the control platform through the wireless network device, so as to improve the positioning accuracy and reduce the cost.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An indoor positioning system comprising:
   a wireless network device configured to receive a positioning request initiated by a positioning tag, send a handshake communication request, and send position coordinate information of the positioning tag to a control platform;
   a positioning headend configured to establish a communication connection with the wireless network device and the positioning tag according to the handshake communication request, collect radio wave signals sent by the positioning tag, and calculate phase information of the positioning tag according to the radio wave signals; and
   a positioning unit configured to calculate the position coordinate information of the positioning tag according to the phase information.

2. The indoor positioning system according to claim 1, wherein the wireless network device comprises:
   a PoE power supply connected to the positioning headend for supplying power to the positioning headend;
   a first antenna array configured to receive the positioning request initiated by the positioning tag;
   a central processing unit connected to the first antenna array, the central processing unit being configured to send the handshake communication request according to the positioning requirement, and receive the phase information of the positioning tag; and
   a data transmission unit connected to the central processing unit, the data transmission unit being configured to communicate with the positioning headend and the positioning tag according to the handshake communication request, and send the position coordinate information of the positioning tag to the control platform.

3. The indoor positioning system according to claim 2, wherein the positioning headend comprises:

a second antenna array configured to communicate with the positioning tag and collect the radio wave signals sent by the positioning tag;

a microcontroller connected to the central processing unit, and the microcontroller being configured to receive the handshake communication request, control the second antenna array to establish a communication connection with the positioning tag, and calculate the positioning tag according to the phase information of the positioning tag; and a power supply unit connected to the PoE power supply and the microcontroller, the power supply unit being configured to supply power to the microcontroller.

4. The indoor positioning system according to claim 3, wherein the positioning unit is arranged in the positioning headend and is electrically connected to the microcontroller to receive the phase information sent by the microcontroller, and the positioning unit calculates the position coordinate information of the positioning tag according to the phase information.

5. The indoor positioning system according to claim 3 further comprising an edge server, wherein:

the positioning unit is set in the edge server;

the data transmission unit is further configured to send the phase information to the edge server;

the positioning unit is further configured to calculate the position coordinate information of the positioning tag according to the phase information in the edge server; and the edge server is configured to return the position coordinate information to the data transmission unit after the positioning unit calculates the location coordinate information.

6. The indoor positioning system according to claim 3, wherein:

the positioning unit is set in the wireless network device;

the positioning unit is further configured to calculate the position coordinate information of the positioning tag according to the phase information in the wireless network device.

7. An indoor positioning method, applied to an indoor positioning system, wherein the indoor positioning system comprises a wireless network device, a positioning headend, positioning tag, a control platform, and a positioning unit, and the positioning method comprises:

receiving a positioning request initiated by the positioning tag and sending a handshake communication request by the wireless network device;

establishing a communication connection with the wireless network device and the positioning tag by the positioning headend according to the handshake communication request;

receiving radio wave signals initiated by the positioning tag and calculating the phase information of the positioning tag according to the radio wave signals through the positioning headend;

calculating the position coordinate information of the positioning tag according to the phase information by the positioning unit;

sending the position coordinate information of the positioning tag to the control platform by the wireless network device.

8. The indoor positioning method according to claim 7, wherein the positioning unit is arranged in the positioning headend and the step of the calculating the position coordinate information of the positioning tag according to the phase information by the positioning unit, comprises:

calculating the position coordinate information of the positioning tag according to the phase information in the positioning headend by the positioning unit.

9. The indoor positioning method according to claim 7, wherein the indoor positioning system further comprises an edge server, the positioning unit is arranged in the edge server, and the step of the calculating the position coordinate information of the positioning tag according to the phase information by the positioning unit, comprises:

receiving the phase information sent by the wireless network device through the edge server;

calculating the position coordinate information of the positioning tag according to the phase information by the positioning unit in the edge server; and returning the position coordinate information to the wireless network device by the edge server after the location coordinate information is calculated.

10. The indoor positioning method according to claim 7, wherein the positioning unit is arranged in the wireless network device, and the step of the calculating the position coordinate information of the positioning tag according to the phase information by the positioning unit, comprises:

sending the phase information to the wireless network device by the positioning headend; and calculating the position coordinate information of the positioning tag according to the phase information in the wireless network device by the positioning unit.

* * * * *